April 8, 1969  H. N. LONGO  3,437,352
BICYCLE SAFETY-WHEEL ATTACHMENT
Filed Oct. 17, 1967
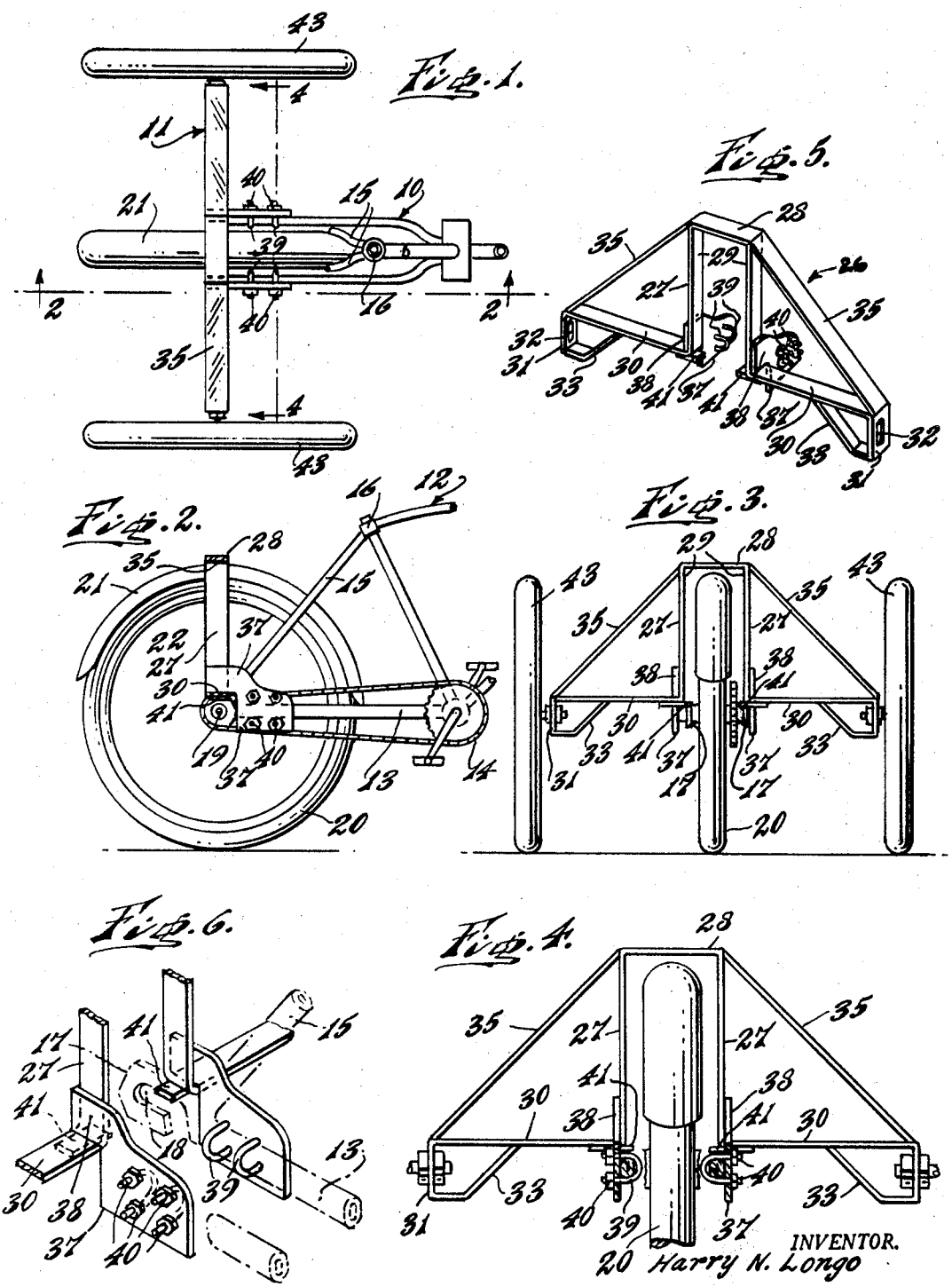
INVENTOR.
Harry N. Longo
BY
Robert K. Youtie
ATTORNEY United States Patent Office 3,437,352
Patented Apr. 8, 1969

3,437,352
BICYCLE SAFETY-WHEEL ATTACHMENT
Harry N. Longo, 107 N. Trenton Ave.,
Atlantic City, N.J. 08401
Filed Oct. 17, 1967, Ser. No. 675,806
Int. Cl. A63b 69/16
U.S. Cl. 280—293                                6 Claims

ABSTRACT OF THE DISCLOSURE

This invention is essentially concerned with means for attaching safety wheels to a bicycle and includes an inverted U-shaped member astride the rear wheel of a bicycle having connection means for connection to the bicycle frame adjacent to the rear axle. Structures outstand from opposite sides of the U-shaped member and carry respective outboard wheels for stabilizing ground engagement.

Background of the invention

While it is well known in the art to provide bicycles with outboard stabilizing wheels, prior devices have not been satisfactory for long-continued usage, being unduly restrictive in vehicle speed and maneuverability, relatively complex in structure and unreliable in use. Further, prior devices of this general type have been relatively difficult to attach to and remove from a bicycle, and often incapable of use with bicycles of different sizes and styles, so that it has been extremely difficult if not impossible to efficiently and economically provide rental bicycles with outboard safety wheels.

Summary

Accordingly, it is an important object of the present invention to provide a safety device of the type described for use with bicycles which overcomes the above-mentioned difficulties, effectively minimizes speed and maneuverability restrictions of such safety devices, is extremely versatile for attachment to bicycles of widely varying sizes and styles, and which can be quickly and easily attached to and removed from bicycles for economic acceptance by bicycle-rental establishments.

It is another object of the present invention to provide a bicycle safety device having the advantageous characteristics mentioned in the preceding paragraph, which is extremely simple in construction, durable and reliable throughout a long useful life, and which can be economically manufactured for sale at a reasonable price.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

Brief description of the drawing

FIGURE 1 is a top plan view showing the rear wheel of a bicycle having attached thereto a safety device of the present invention, parts being removed and broken away.

FIGURE 2 is sectional elevational view taken generally along the line 2—2 of FIGURE 1.

FIGURE 3 is a rear elevational view of the device of FIGURE 2.

FIGURE 4 is a transverse sectional view taken generally along the line 4—4 of FIGURE 1.

FIGURE 5 is a rear perspective view showing a frame structure of the instant apparatus apart from a bicycle.

FIGURE 6 is a partial perspective view showing the frame structure of FIGURE 5 with associated parts of a bicycle in phantom.

Description of the preferred embodiment

Referring now more particularly to the drawing, and specifically to FIGURES 1–4 thereof, a bicycle is partially illustrated and generally designated 10 therein, and an attachment of the present invention is associated with the bicycle and generally designated 11.

The bicycle may be conventional, and, as illustrated, may include a frame 12 having a pair of generally horizontal, laterally spaced frame members 13 extending rearwardly from a pedal sprocket 14. A pair of laterally spaced obliquely downwardly and rearwardly extending frame members 15 extend between a seat mount 16 and the rearward ends of the frame members 13. On each side, a respectively pair of frame members 13 and 15 have their rearward ends fixedly secured together as by an axle support or mounting plate 17. That is, a pair of laterally spaced, generally vertically disposed axle supports or plates 17 are located in facing relation and formed with thru openings 18 for receiving opposite ends of a rear-wheel axle 19.

A rear wheel 20 may be carried by the axle 19 in conventional manner, and the axle conventionally secured, as by threaded fasteners or nuts 22 to the axle supports 17. A rear-wheel fender 21 may be located over the rear wheel 20, suitably fixed, as to the frame members 15 and by other struts, if desired. It will therefore appear that the structure thus far described may be conventional.

The safety attachment 11 includes an open framework 26, which may be formed stiff, but slightly resilient bar stock, say steel or other suitable material. The framework 26 includes an inverted generally U-shaped member 27 having a laterally extending bridging portion 28, and a pair of generally vertical legs 29 depending from opposite ends of the bridging portion.

From the lower ends of respective legs 29, extending oppositely outward therefrom in generally horizontal alignment, are a pair of arms 30. An outboard axle support 31 depends generally vertically from the outer end of each arm 30, advantageously being formed therein with a vertically elongate thru slot or opening 32. From the lower end of each outboard axle support 31 extends a rigidfying strut formation 33 which passes obliquely upwardly and laterally inwardly for fixed securement, as by welding, to a medial region of the adjacent arm 30.

As shown in the illustrated embodiment, the U-shaped member 27, arms 30, outboard axle supports 31 and rigidifying strut formations 33 may all be integrally formed of a single suitably bent bar stock.

Further rigidity is afforded the framework 26 by a pair of oblique struts 35 each extending diagonally downwardly and outwardly from an upper region of a respective leg 29 to an outer region of the adjacent arm 30, being suitably fixed thereto, as by welding or other suitable means. It will therefore be apparent that the framework 26 is effectively rigidified at all locations except the bridging portion 28, which remains at least slightly resiliently flexible, for a purpose appearing presently.

Fixedly secured to each leg 29, at a lower region thereof, is a mounting plate 37. More specifically, each mounting plate 37 is disposed generally vertically in laterally spaced facing relation with the other mounting plate, being of a somewhat triangular configuration and extending generally forwardly from the respective leg 29. Each mounting plate 37 includes an upper rear tab or extension 38 secured, as by welding or the like, in facing engagement with the laterally outer side of the respective leg 29, such that the associated mounting plate extends forwardly and downwardly therefrom. Carried by each mounting plate 37, forwardly of the adjacent leg 29, are a pair of fasteners, such as U bolts 39 having their bight regions on the inner facing sides of the respective mounting plates, and extending outwardly therethrough. Threadedly engaged on the ends of the U bolts 39, outward of the mounting plates 37 are suitable nuts 40.

In addition, there is secured by welding or other suitable means on the underside of each arm 30 adjacent to the inner end thereof an inward extension member or bar 41, which projects laterally inwardly from the lower end of each leg 29. The bars or extensions 41 thus extend inwardly toward and terminate short of each other, being rigidly secured to the framework 26.

In assembly of the attachment 11 with the bicycle 10, the framework 26 is arranged with the U-shaped formation 27 spacedly astride the rear wheel 20 and fender 21. In this condition, the inward extensions 41 each rest upon the upper edge of a respective axle-support member or plate 17, as best seen in FIGURES 3, 4 and 6. Further, the mounting members or plates 37 are each disposed outward of and against a respective forwardly and rearwardly extending bicycle-frame member 13, resilient flexibility of the bridging portion 28 enabling the plates 37 to lie against respective frame members 13. In this condition, the fasteners 39 are drawn tight about the bicycle-frame members 13 by the nuts 40 to firmly secure the framework 26 to the bicycle. Obviously, the above-described procedure is extremely quick and simple, detachment being equally easy by mere reversal of the steps.

A pair of outboard wheels 43 are each disposed adjacent to respective additional axle supports 31, with the axles of respective wheels engaged through adjacent openings 32 and there secured to the axle supports by suitable fastener means, such as nuts 44. Obviously, vertical location of the wheels 43 is facilitated by vertical shifting of the wheel axles in the slots 32 and securement of the axles at a selected vertical location. If desired, the wheels 43 may remain attached to the framework 26 and the entire assembly 11 simultaneously removed from and replaced on different bicycles, as desired. Moreover, the hereinbefore described structure readily accommodates to an extremely wide variety of types and sizes of bicycles without changes in structure or design.

In use, the outboard wheels 43 and 44 provide positive support against undue tilting or falling of a bicycle, so that aged or infirm persons may enjoy bicycling, as well as learners and others.

From the foregoing, it is seen that the present invention provides a bicycle safety attachment which fully accomplishes its intended objects and is well adapted to meet practical conditions of manufacture and use.

What is claimed is:

1. A safety device for attachment to a bicycle having a rear wheel, a pair of rear-wheel-axle supports and a frame member extending forwardly from each axle support; said device comprising an inverted generally U-shaped member for location astride said rear wheel, a mounting plate fixed to each leg of said U-shaped member for location adjacent to a respective axle and frame member, fastener means for detachably securing said mounting plates to said frame members, a pair of arms outstanding oppositely from respective legs of said U-shaped member, a pair of additional axle supports at outer ends of said arms, and a pair of stabilizing wheels carried by said additional axle supports.

2. A safety device according to claim 1, in combination with a pair of struts each extending diagonally from a respective leg of said U-shaped member to the adjacent arm, for rigidifying said arms.

3. A safety device according to claim 1, said U-shaped member having its bight portion resiliently bendable for location of said mounting plates firmly against the frame members of different styles and sizes of bicycles.

4. A safety device according to claim 1, said fastener means comprising U bolts embracing said frame members.

5. A safety device according to claim 1, said additional axle supports each including a generally upright member having a vertically elongate thru opening for adjustably receiving the axle of an additional wheel.

6. A safety device according to claim 1, in combination with an inward extension from each leg for resting on respective rear-wheel-axle supports.

References Cited
UNITED STATES PATENTS

| | | | |
|---|---|---|---|
| 661,145 | 11/1900 | Hausmann | 280—293 |
| 994,715 | 6/1911 | Brazil | 280—293 |
| 1,921,029 | 8/1933 | Hess | 280—293 |
| 2,723,133 | 11/1955 | Pawsat | 280—293 |

KENNETH H. BETTS, *Primary Examiner.*